United States Patent [19] [11] Patent Number: 4,479,770
Slat et al. [45] Date of Patent: Oct. 30, 1984

[54] IN-MOLD LABEL DISPENSER FOR BLOW MOLDING MACHINE

[75] Inventors: William A. Slat, Brooklyn, Mich.; Richard C. Darr, Seville, Ohio; Richard L. Dunlap, Cairo, Ohio; Craig A. Larson, Westfield Court, Ohio

[73] Assignee: Plastipak Packaging, Inc., Plymouth, Mich.

[21] Appl. No.: 447,872

[22] Filed: Dec. 8, 1982

[51] Int. Cl.³ .......................... B29C 5/06; B29C 27/14
[52] U.S. Cl. ..................................... 425/503; 264/509; 264/511; 271/9; 271/14; 425/504; 425/537
[58] Field of Search .................. 425/503, 504, 537; 264/509, 511, DIG. 64; 156/DIG. 29; 271/9, 14

[56] References Cited

U.S. PATENT DOCUMENTS 3,575,409  4/1971  Calvert .................................. 271/95
3,986,807 10/1976  Takegami et al. ................... 425/537
4,293,365 10/1981  Geyser et al. ............... 156/DIG. 29
4,359,314 11/1982  Hellmer ............................... 264/509
4,397,625  8/1983  Hellmer et al. ..................... 264/509

Primary Examiner—Jan Silbaugh
Assistant Examiner—Hubert C. Lorin
Attorney, Agent, or Firm—Brooks & Kushman

[57] ABSTRACT

An in-mold label dispenser (22) for a blow molding machine is disclosed as including a dispensing head (56) mounted for rectilinear movement along a first axis A between a label magazine (48) and an open mold (28) and having a label carrier (58) mounted on the dispensing head for rectilinear movement between retracted and extended positions along a second axis B transverse to the first axis A. Rectilinear movement of the dispensing head (56) along the first axis A and coordinated extending and retracting rectilinear movement of the label carrier (58) along axis B transfers a label (50) from the magazine (48) to the mold (28) in preparation for the blow molding operation. The label dispenser (22) has particular utility when provided with a pair of the label carriers (58) to simultaneously transfer a pair of labels (50) to the open mold (28) within the confined space limitations involved. A drive linkage (66) is driven by a first gear unit (72) to reciprocally move the dispensing head (56), while a second gear unit (106) rotatably drives elongated supports (92) which mount the dispensing head (56) for its rectilinear movement and drive cams (108) that move the label carriers (58). Both the first and second gear units (72,106) are driven by a common input (156) to coordinate the movement of the dispensing head (56) with the movement of the label carriers (58).

12 Claims, 11 Drawing Figures

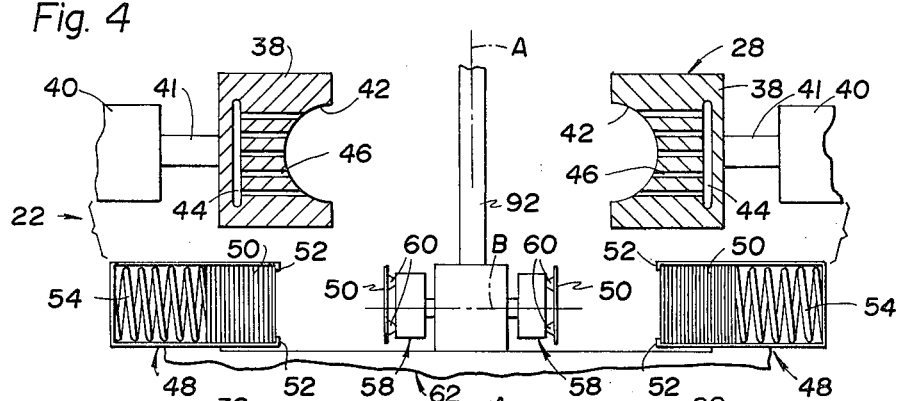
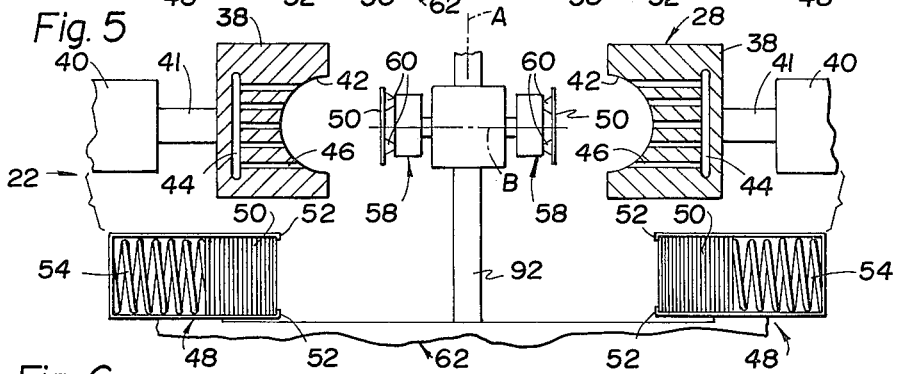
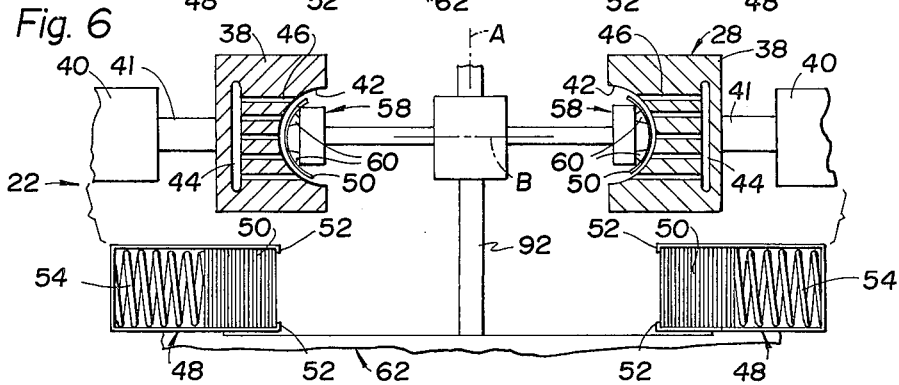
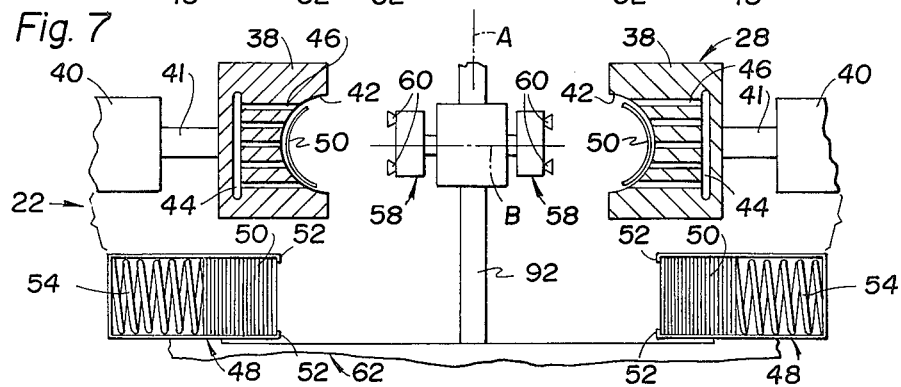

IN-MOLD LABEL DISPENSER FOR BLOW MOLDING MACHINE

TECHNICAL FIELD

This invention relates generally to blow molding machines and, more particularly, to an in-mold label dispenser for a blow molding machine.

BACKGROUND ART

Blow molding machines conventionally include an extruder that extrudes a tube of hot plastic between open sections of a mold. Closing of the mold then clamps the tube and allows air to be blown into the tube such that it assumes the shape of the mold. After suitable cooling has taken place, the mold sections are opened to allow ejection of the molded part.

Blow molded parts such as containers have conventionally included paper labels that are glued thereto after the molding to identify the contents of the container to the consumer. One problem with such paper labels is that they can become wrinkled if dampened and can also become detached from the container if a waterproof glue is not used. Also, paper labels require a separate labeling step after the molding which thus adds to the cost of the container.

In-mold labeling has been developed in the recent past to provide superior bonding of labels to blow molded parts. This in-mold labeling is performed by inserting a label within the mold prior to the extrusion of the hot plastic tube and subsequent closing of sections of the mold in preparation for the blowing operation. The subsequent blowing operation forms the hot plastic tube around the label to the shape of the mold and activates a heat sensitive adhesive that provides a permanent bond which is incapable of being broken by moisture or otherwise. Also, such in-mold labeling provides a smooth transition between the label and the adjacent surface of the molded part and further provides additional strength since the label cooperates with the plastic in resisting deformation. Such strengthening also allows the use of less plastic to blow mold the part and thereby reduces the ultimate cost to the consumer. Furthermore, when utilized with containers for carbonated beverages, it is believed that in-mold labeling may reduce the flow of carbon dioxide out through the container wall over a period of time and thereby increases the shelf life.

Prior in-mold label dispensers for blow molding machines conventionally include a label carrier having vacuum cups that receive a label from a label magazine and then are movable to deposit the label within the mold cavity whereupon termination of a vacuum drawn at the suction cups allows a vacuum drawn at the mold cavity to secure the label in position in preparation for the molding. Such vacuum carriers have previously been mounted on pivotal arms that move in an angular path with respect to the direction of opening and closing movement of mold sections of the mold in order to permit depositing of the labels in the confined space permitted by the extent of the mold opening. With the pivotal arm type of label carrier, only one label can be deposited within the mold at a given time since movement thereof on the pivotal arm toward one mold section interferes with pivotal movement of a similar arm toward an opposed mold section for depositing another label. Another prior art type of in-mold label dispenser includes a label carrier that is moved along an abruptly curved path by a complex linkage which executes a 180 degree turn in order to transfer labels from a label magazine to the mold in preparation for molding. With this complex linkage type label dispenser, it is likewise not possible to deposit more than one label in the mold at a given time due to the limited space present upon opening of the mold. As such, the prior art types of label dispensers utilized with in-mold labeling for blow molding machines have an increased cycle time due to the necessity of depositing labels sequentially rather than at the same time.

DISCLOSURE OF INVENTION

An object of the present invention is to provide an improved in-mold label dispenser for a blow molding machine wherein the label dispenser has an uncomplicated construction that is nevertheless effective in performance.

In carrying out the above object, the inmold label dispenser according to the invention is constructed for use with a blow molding machine including a plurality of molds each of which includes mold sections movable between open and closed positions. The mold sections include cavity sections which cooperatively define a cavity in which the molding is performed with the mold sections in the closed position. Upon movement of the mold sections to the open position, a molded part can be ejected from the mold after a sufficient cooling time subsequent to the blow molding operation.

The in-mold label dispenser according to the invention includes a label magazine for storing labels that are deposited within the mold prior to the blow molding. A dispensing head of the dispenser is mounted for rectilinear movement along a first axis from adjacent the label magazine to between the mold sections of the mold in the open position where the mold sections are spaced from each other. A label carrier is mounted on the dispensing head for rectilinear movement between retracted and extended positions along a second axis that is transverse to the first axis preferably in a perpendicular relationship. A drive mechanism moves the dispensing head and the label carrier in a coordinated fashion to transfer labels from the magazine to the mold for the in-mold labeling prior to the blow molding operation. Initially the drive mechanism moves the label carrier from the retracted position to the extended position with the dispensing head adjacent the label magazine such that the label carrier receives the label from the magazine. Thereafter, the drive mechanism moves the label carrier to the retracted position with the label thereon and also moves the dispensing head to between the mold sections of the mold in the open position. Subsequently, the drive mechanism moves the label carrier to the extended position to deposit the label on one of the mold sections within its cavity section. Finally, the drive mechanism moves the label carrier back to the retracted position and moves the dispensing head from between the mold section back to adjacent the label magazine in preparation for the next cycle.

In its preferred construction, the label dispenser includes a pair of the label magazines and a pair of the label carriers that are utilized to deposit a pair of labels on the mold sections of the mold in preparation for the in-mold labeling. The construction and operation of the label dispenser wherein the dispensing head moves rectilinearly along the first axis and the label carriers move rectilinearly along a second axis transverse to the first axis permits both labels to be simultaneously deposited on the mold sections even though there is somewhat limited space between the mold sections as this label depositing is performed.

The label dispenser preferably includes a drive linkage having first and second ends and also includes a first gear unit that drives the first end of the drive linkage. A connection between the second end of the drive linkage and the dispensing head provides the dispensing head movement under the impetus of the drive unit. Such driving is advantageously performed by the preferred construction of the drive linkage which includes a pivotal lever driven by the gear unit and a link that connects the lever to the dispensing head. Preferably the lever and the link have a pivotal connection to each other and the connection of the link to the dispensing head is also of the pivotal type such that the link pivots with respect to the lever and with respect to the dispensing head during the driving of the dispensing head. Increased rectilinear movement of the dispensing head is achieved with the pivotal lever by providing it with a bent end adjacent the pivotal connection thereof to the link.

The preferred construction of the label dispenser also includes a base as well as a pair of elongated supports that extend parallel to each other and mount the dispensing head for its rectilinear movement. Bearings mount the elongated supports on the base for rotation about their elongated axes, and the drive mechanism includes a second gear unit that rotates the supports during operation of the label dispenser. A pair of cams respectively extend between the pair of elongated supports and the pair of label carriers to provide extending and retracting movement of the label carriers upon rotation of the elongated supports under the impetus of the second gear unit.

Effective driving of the dispensing head is accomplished with the preferred construction of the label dispenser wherein the connection between the second end of the drive linkage and the dispensing head is located between the elongated supports on which the dispensing head is mounted for rectilinear movement. A common input is also provided for driving both of the gear units to coordinate the movement of the dispensing head and the label carrier during operation of the label dispenser.

The preferred construction of the dispensing head includes a pair of parallel slideways on which the pair of label carriers are mounted for rectilinear extending and retracting movement. Each label carrier includes an associated track mounted thereon and extending transversely to the direction of the rectilinear movement of the label carriers. A cam member of each cam is received within the track of the associated label carrier to provide the label carrier movement as the cams are pivoted by rotation of the elongated supports. In addition, the cam members also preferably have adjustable connections to the cams to control the degree of extending and retracting movement of the label carriers upon rotation of the elongated supports.

Each label carrier of the label dispenser is preferably made from a suitable plastic such as nylon just in case there is a malfunction that results in the label carrier impacting one of the mold sections or another component of the blow molding machine during movement of the dispensing head and/or the label carrier. If such an impact occurs, the plastic construction of the label carrier allows it to fracture without damage to the other components of the dispenser.

The objects, features, and advantages of the present invention are readily apparent from the following detailed description of the best mode for carrying out the invention when taken in connection with the accompanying drawings.

BRIEF DESCRIPTION OF DRAWINGS

FIGS. 3, 4, 5, 6, and 7 are views similar to FIG. 2 but illustrating the label dispenser during successive steps of its operation prior to movement back to the initial position of FIG. 2 in preparation for the next cycle;

BEST MODE FOR CARRYING OUT THE INVENTION

Figure 1:
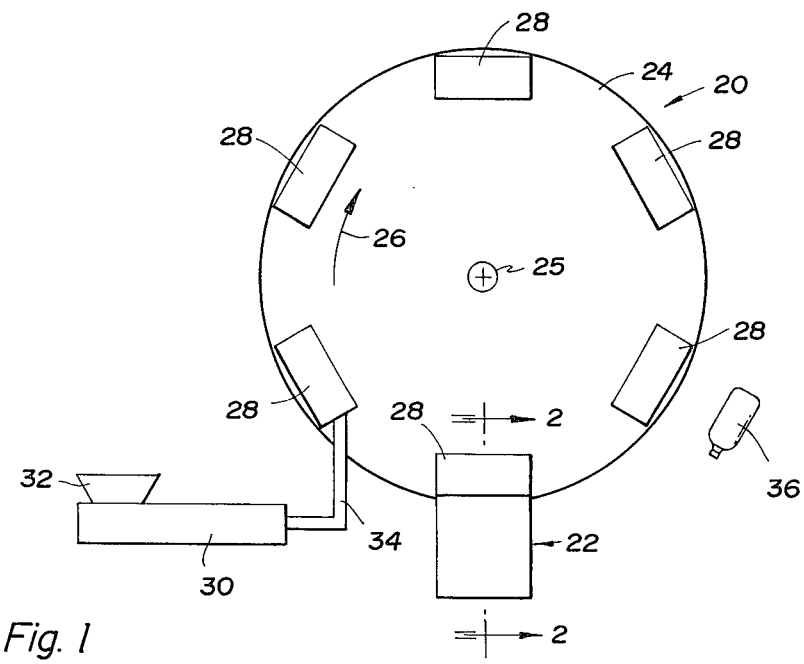
FIG. 1 is a schematic elevation view of a blow molding machine including a schematically indicated in-mold label dispenser constructed in accordance with the present invention.

Referring to FIG. 1 of the drawings, a blow molding machine generally indicated by reference numeral 20 utilizes an in-mold label dispenser 22 constructed in accordance with the present invention as is hereinafter more fully described. Blow molding machine 20 is illustrated as including a wheel 24 mounted by a shaft 25 for rotation in a clockwise direction as illustrated by arrow 26. A plurality of molds 28 are mounted on the pheriphery of the wheel for movement past the label dispenser 22 to adjacent an extruder 30 whose input receives raw plastic from a hopper 32 and whose output 34 feeds an extruded plastic tube to the adjacent mold 28 in preparation for a conventional blow molding operation wherein air expands the plastic tube to the shape of the mold. After cooling upon rotation for about two-thirds of a revolution of the wheel 24, the blow molded plastic part 36 is ejected in preparation for the next cycle.

Figure 2:
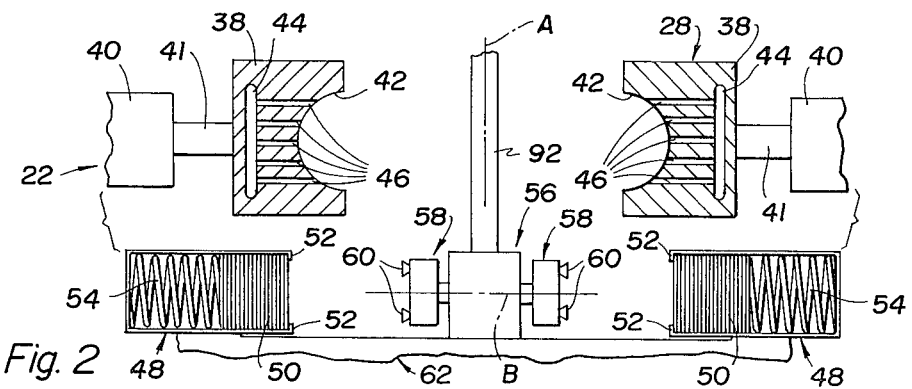
FIG. 2 is an elevation view taken in section along the direction of line 2—2 through an open mold of the blow molding machine and illustrating the label dispenser schematically at the beginning of its cycle of operation.

With combined reference to FIGS. 1 and 2, each mold 28 includes a pair of mold sections 38 that are movable between open and closed positions. Suitable cylinders 40 have piston connecting rods 41 that move the mold sections 38 to the open position spaced from each other to permit the ejection of the molded part 36 as previously described. Each mold section 38 has a cavity section 42 that opposes the cavity section of the other mold section. Adjacent the label dispenser 22, the cylinders 40 position the mold sections 38 in their open position shown so as to permit labels to be deposited with the cavity sections 42 as is hereinafter more fully described. Upon movement of each mold 28 to adjacent the extruder 30, a hot plastic tube is extruded between the mold sections 38 which are then moved to their closed position by the cylinders 40 so as to engage each other and define an internal cavity that receives the hot plastic tube. Blow molding of the hot plastic tube is then performed to provide expansion thereof to the shape of the mold cavity and to secure the previously deposited label to the finished part as the heat involved activates a heat sensitive adhesive on the label.

With reference to FIG. 2, the in-mold label dispenser 22 of the invention is illustrated as having a construction for applying a pair of labels to the mold 28 such that one label is deposited on each mold section 38 at the same time another label is deposited on the other mold section 38 prior to the blow molding operation. It should be understood that the construction of the label dispenser can also be effectively used to deposit a single label within the cavity section 42 of one of the mold sections 38. However, as is hereinafter more fully apparent, the label dispenser construction has particular utility when utilized to simultaneously deposit a pair of the labels respectively on the pair of mold sections 38 in preparation for the blow molding operation previously described.

With continuing reference to FIG. 2, the mold sections 28 of each mold 28 include vacuum chambers 44 having passages 46 that are communicated with a surface of the cavity section 42 such that drawing of a vacuum in the chamber 44 secures the label in position in preparation for the blow molding operation. In this connection, it should be noted that the surface of each cavity section 42 is preferably textured so as to distribute the vacuum and thereby secure and accurately position the label in preparation for the blow molding operation.

Figure 3:
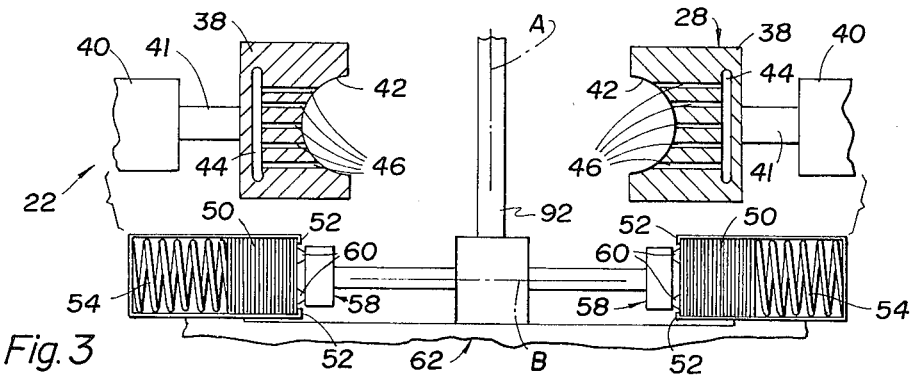

Label dispenser 22 is illustrated in FIG. 2 as including a pair of spaced label magazines 48 for storing stacks of labels 50 in preparation for being deposited within the mold 28 prior to the blow molding operation. Spring fingers 52 of each magazine 48 retain the stacked labels 50 which are biased by associated springs 54 so as to be positioned in preparation for being deposited within the cavity sections 42 of the mold sections 38. Between the label magazines 48, a dispensing head 56 is mounted for rectilinear movement along a first axis A from between the label magazines to between the mold sections 38 as is hereinafter more fully described. A pair of label carriers 58 are mounted on the dispensing head 56 for parallel movement to each other along a second axis B transverse to the first axis A. As is hereinafter more fully described, the label carriers 58 are driven between the retracted positions shown in FIG. 2 and oppositely projecting extended positions as shown in FIG. 3. Label dispenser 22 also includes a drive mechanism including first and second solid mechanical drives illustrated in FIGS. 8 through 11 for moving the dispensing head 56 and the label carriers 58 through the cycle of operation of the dispenser schematically illustrated by FIGS. 2 through 7 as is hereinafter more fully described.

With reference to FIG. 2, the cycle of operation of the label dispenser 22 begins with the dispensing head 56 located between the label magazines 48 with the label carriers 58 located in their retracted positions. Each label carrier 58 includes suction cups 60 that face outwardly toward the labels 50 of the magazines 48. Driving movement of the label carriers 58 along axis B from the retracted positions of FIG. 2 to the extended positions of FIG. 3 initially engages the suction cups 60 with the adjacent labels 50 to secure the labels to the label carriers. Thereafter, the label carriers 58 are moved along axis B from the extended positions of FIG. 3 to the retracted positions of FIG. 4 with a pair of labels 50 secured thereto, and the dispensing head 56 is moved along axis A from the position of FIG. 4 between the label magazines 48 to the position of FIG. 5 between the open sections 38 of the adjacent mold 28. Subsequently, the label carriers 58 are moved along axis B in opposite directions from the retracted positions of FIG. 5 to the extended positions of FIG. 6 to deposit the labels 50 on the cavity sections 42 of the mold sections 38. At approximately the same time the labels 50 are engaged with the cavity sections 42 of the mold sections 38, the vacuum drawn at the suction cups 60 is terminated and a positive pressure is supplied thereto so as to release the labels from the carriers 58 in order to permi drawn at the mold sections 38 to secure the labels in position. Finally, the label carriers 58 are moved along axis B from the extended positions of FIG. 6 to the retracted positions of FIG. 7 and the dispensing head 56 is moved along axis A back to the position of FIG. 2 in preparation for the next cycle.

After the labels are secured to the mold 28 by the label dispenser 22 adjacent the lower side of the machine wheel 24 shown in FIG. 1, clockwise rotation of the machine wheel 24 moves the mold 28 to adjacent the extruder output 34. Extrusion of a hot plastic tube between the mold sections 38 and closing of the mold sections 38 is then followed by the blowing operation which expands the hot plastic tube to the shape of the mold cavity. As previously mentioned, the heat involved activates a heat sensitive adhesive on the labels 50 to provide securement thereof to the molded part. As the molding is taking place at the mold 28 adjacent the extruder 30, the following mold 28 is located adjacent the label dispenser 22 to receive labels as previously described and the preceding molds 28 are cooling prior to opening for ejection of the molded part 36 just before reaching the label dispenser 22.

It should also be noted that the first and second axes A and B are preferably perpendicular to each other such that the label carriers 58 move perpendicular to the direction of movement of the dispensing head 56. However, in certain applications the axes A and B may deviate from the perpendicular such that the label carriers 58 move with a certain extent of angularity from the perpendicular to the movement of the dispensing head 56.

Figure 8:
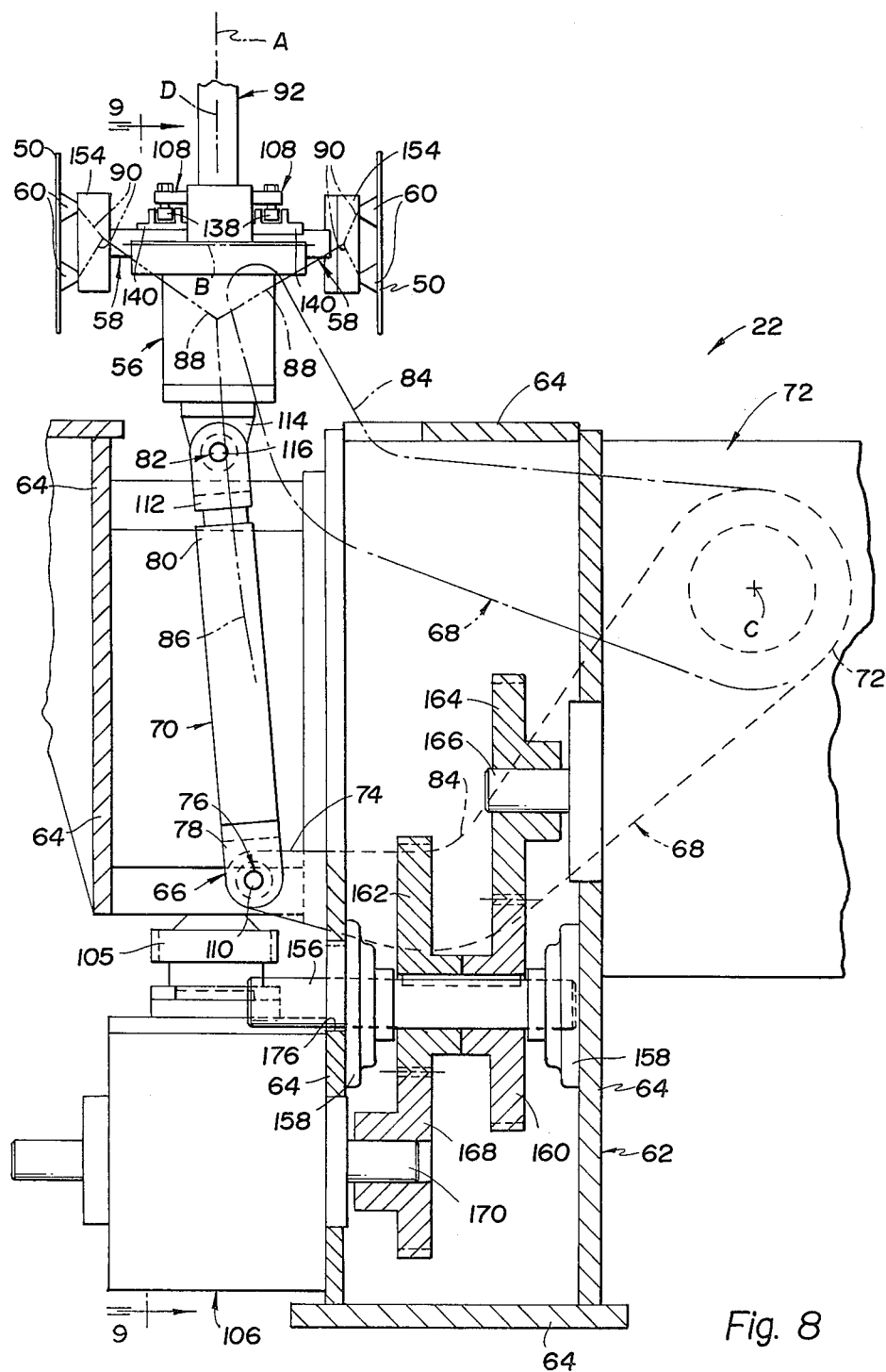
FIG. 8 is an enlarged elevation view taken partially in section looking in the same direction as FIG. 2 and illustrating a drive mechanism that moves a dispensing head of the dispenser.
Figure 9:
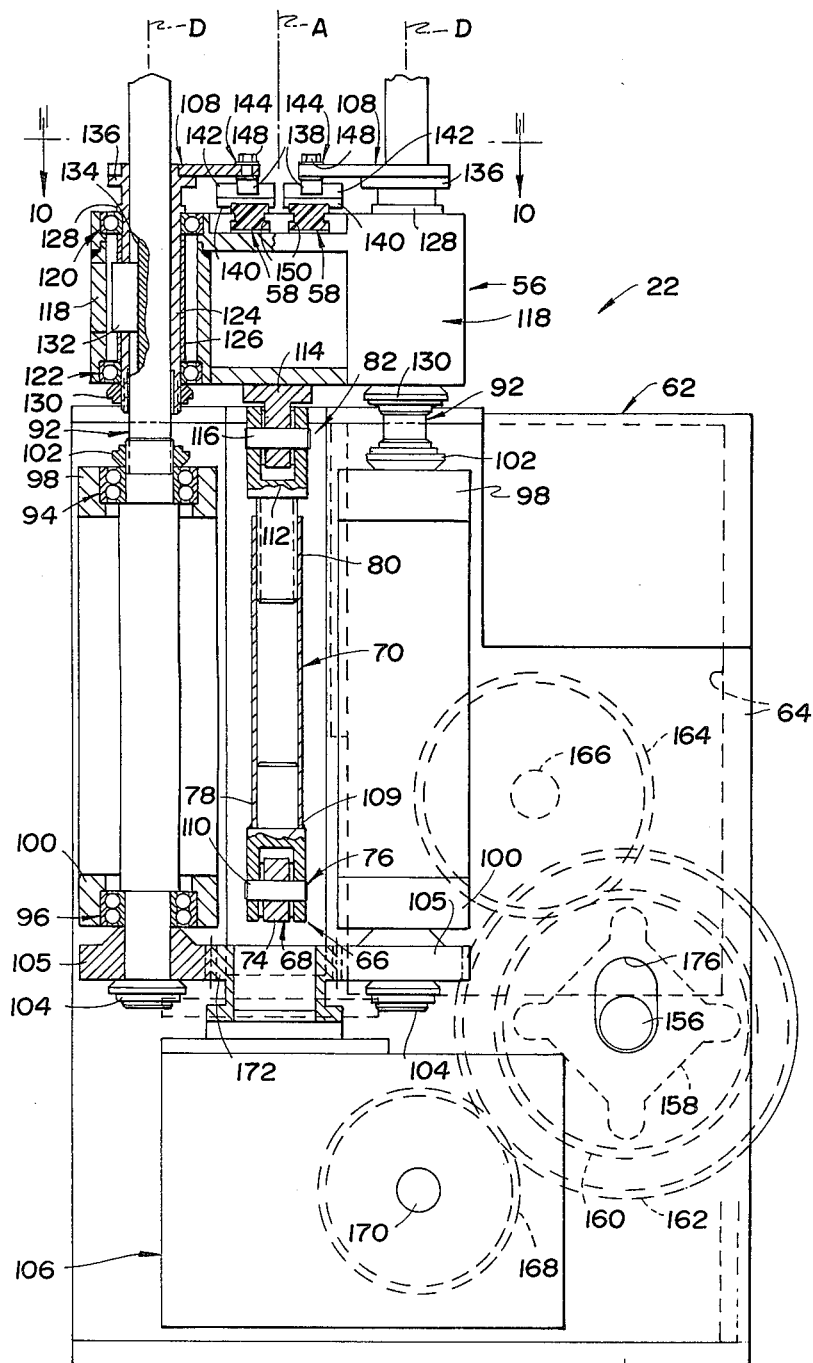
FIG. 9 is an elevation view taken partially in section along the direction of line 9—9 in FIG. 8 and illustrating elongated supports on which the dispensing head is moved rectilinearly as well as illustrating cams that move label carriers mounted on the dispensing head.

With combined reference to FIGS. 8 and 9, the label dispenser 22 includes a base that is collectively indicated by reference numeral 62 and composed of various plates 64 that are secured to each other in any suitable manner such as by welding or bolting. A drive linkage is generally indicated by 66 as illustrated in FIG. 8 and includes a pivotal lever 68 and a connecting link 70. A first end 72 of the lever 68 is pivotally driven by a gear unit 72 about an axis D between the lower and upper positions illustrated. A second end 74 of the lever 68 has a pivotal connection 76 with a first end 78 of the link 70. Opposite the pivotal connection 76, the link 70 has a second end 80 which has a pivotal connection 82 with the dispensing head 56. Driving of the gear unit 72, as is hereinafter more fully described, moves the dispensing head 56 rectilinearly in a reciprocal manner to provide the label transferring as previously described. It will be noted that the second end 74 of lever 68 has a relatively abrupt bend 84 which provides increased rectilinear movement of the dispensing head 56 upon pivoting of the lever between its two positions illustrated. Also, a schematically indicated flexible conduit 86 extends along the linkage 66 and has branches 88 which in turn have sub-branches 90 communicated with the suction cups 60. A suitable vacuum source is connected to the conduit 86 to draw a vacuum at the suction cups 60 in order to secure the labels and, thereafter, a positive pressure is supplied to the conduit 86 to subsequently release the labels as previously described.

With reference to FIG. 9, a pair of elongated supports 92 extend parallel to each other and mount the dispensing head 56 on the base 62 for its rectilinear movement along axis B. Upper and lower antifriction bearings 94 and 96 rotatably mount each elongated support 92 on upper and lower support lugs 98 and 100 fixed on the base 62. Suitable upper and lower locknuts 102 and 104 on the elongated supports 92 respectively engage the upper antifriction bearings 94 and drive gears 105 on the elongated supports below the lower antifriction bearings 96 to secure the elongated supports in position for rotation about associated axes D that extend parallel to the axis A of the dispensing head movement. As is hereinafter more fully described, the drive mechanism of the dispenser includes a second gear unit 106 that rotates the elongated supports 92 about their associated axes D, and the drive mechanism also includes a pair of cams 108 that extend between the elongated supports 92 and the pair of label carriers 58 to provide extending or retracting movement of the label carriers upon rotation of the elongated supports under the impetus of the second gear unit.

With continuing reference to FIG. 9, it will be noted that the pivotal connection 82 of link 70 to the dispensing head 56 is located between the pair of elongated supports 92 that mount the dispensing head for its rectilinear movement. Link 70 has a hollow construction so as to be lightweight and thereby facilitate the driving of the dispensing head 56. At its first end 78, the link has a clevis 109 whose legs receive the lever end 74 with a pin 110 of the pivotal connection 76 extending between the legs and through a hole in the lever end to provide the pivotal connection of the link and the lever. At its second end 80, the link 70 receives a clevis 112 whose legs receive a connection lug 114 mounted on the lower side of the dispensing head 56. A pin 116 of the pivotal connection 82 extends between the legs of the clevis 112 through a hole in the lug 114 to provide the pivotal connection of the link to the dispensing head 56.

As illustrated in FIG. 9, the dispensing head 56 includes a hollow housing 118 so as to be lightweight. Upper and lower antifriction bearings 120 and 122 are supported on the dispenser housing 118 and rotatably support a bushing 124 for rotation about the associated axis D about which the adjacent elongated support 92 is rotatable. A spacer 126 surrounds each bushing 124 and engages the inner race of each of the antifriction bearings 120 and 122 to maintain the separation between the bearings. An upper shoulder 128 of bushing 124 engages the upper side of the inner race on the upper bearing 120, while a locknut 130 engages the lower side on the inner race of the lower bearing 122 in order to maintain the bearings in position. A key 132 is fixed on each bushing 124 and is slidably received within an elongated slot 134 in the elongated support 92 extending along its length parallel to the rotational axis D. Cams 108 are fixedly mounted on the upper ends 136 of bushings 124 such that rotation of the elongated supports 92 rotates the cams to provide movement of the label carriers 58 between their extended and retracted positions respectively shown by FIGS. 10 and 11.

Figure 10:
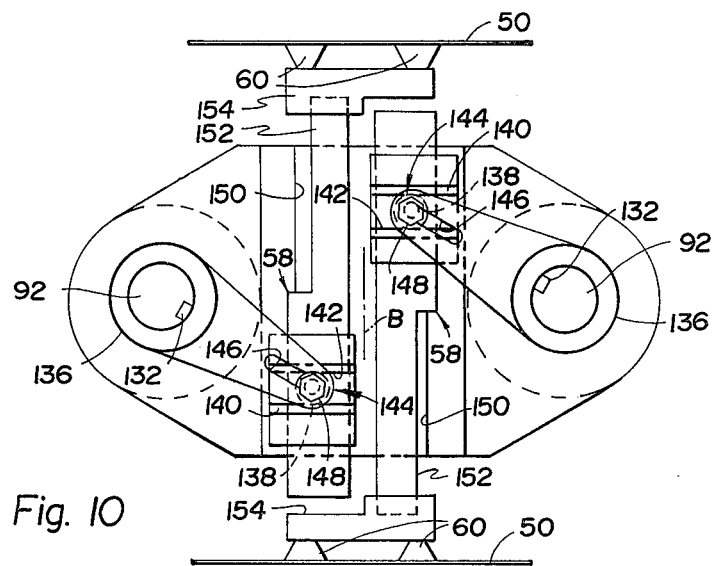
FIG. 10 is a top plan view taken along the direction of line 10—10 in FIG. 9 and showing the dispensing head with the label carriers positioned in retracted positions by the cams.

With combined reference to FIGS. 9 and 10, each cam 108 extends outwardly from the associated elongated support 92 and has a cam member 138 secured to its outer end. A track 140 is secured to the upper side of each label carrier 58 and defines a channel 142 that receives the associated cam member 138. Track channels 142 extend transversely in a perpendicular relationship to the direction of label carrier movement along axis C such that the rotation of the cams 108 moves the label carriers 58 as the cam members 138 move along the lengths of the channels. An adjustable connection 144 secures each cam member 138 to the associated cam 108 and is provided by a slot 146 and a bolt 148 that extends through the slot to secure the cam member. Adjustment of the position of each cam member 138 along the length of the associated cam slot 146 controls the extent of movement of the label carrier 58 driven thereby for any given extent of rotation of the associated cam 108.

Figure 11:
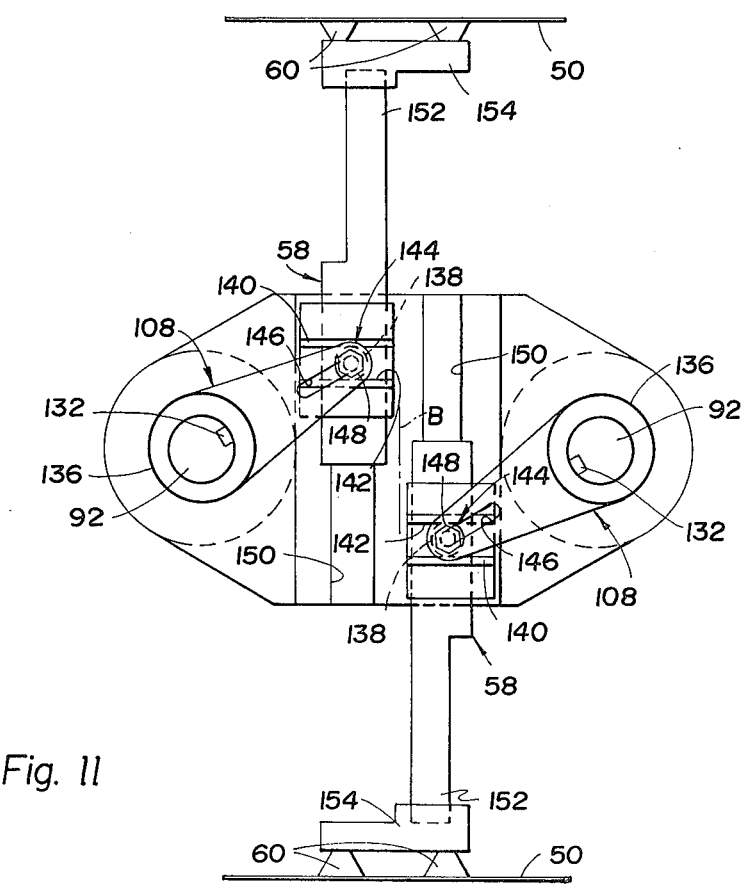
FIG. 11 is a view similar to FIG. 10 but showing the label carriers moved to extended positions by the cams.

As illustrated in FIG. 9, each of the label carriers 58 is made from a suitable plastic such as nylon and has oppositely facing side slots that are received by projections of an associated slideway 150 for movement on the dispensing head 56. An outer end 152 of each label carrier 58 is illustrated in FIGS. 10 and 11 as supporting a pad 154 on which the suction cups 60 are mounted. The plastic construction of each label carrier 56 allows fracturing thereof if the label carrier is inadvertently impacted with one of the molds or any other component of the machine due to a malfunction or otherwise.

With reference to FIG. 8, a shaft 156 is provided as a common input for driving both the first and second gear units 72 and 106 to coordinate the movement of the dispensing head 56 and the label carriers 58 with each other in association with the movement of the molds of the blow molding machine with which the label dispenser is utilized. Shaft 156 is rotatably mounted by a pair of bearings 158 mounted on plates 64 of the base 62 with a pair of gears 160 and 162 mounted on the shaft between the bearings. Gear 160 is meshed with an offset gear 164 that is mounted on an input shaft 166 of the first gear unit 72. Suitable gearing and camming of the gear unit 72 is driven by the input shaft 166 to drive the pivotal arm 68 of linkage 66 in order to move the dispensing head 56 in the manner previously described. Gear 162 is meshed with an offset gear 168 that is mounted on an input shaft 170 that drives the second gear unit 106. Suitable gearing and camming of the second gear unit 106 drives an output gear 172 which is mounted as shown in FIG. 9 on top of the gear unit between the lower ends of the two elongated supports 92 just below their lower mounting lugs 100. Drive gears 105 on the lower ends of elongated supports 92 are meshed with the output gear 172 to provide driving rotation of the elongated supports in order to move the cams 108 that operate the label carriers 56 in the manner previously described. The one plate 64 on which the one bearing 158 is mounted includes a suitable slot 176 that permits the input shaft 156 to be repositioned for use with different size gears in order to change the frequency of operation of the label dispenser when a different number of molds are utilized with the blow molding machine.

It should be noted that the gear units 72 and 106 for driving the dispensing heads 56 and the label carriers 58 can incorporate camming whose operation begins the movement thereof along axis A or B before the movement is terminated along the other axis. For example, the dispensing head 56 can be driven so as to start moving from the position of FIG. 4 to the position of FIG. 5 before the label carriers 58 have been fully moved from the extended positions of FIG. 3 to the retracted positions of FIG. 4. Such driving decreases the cycle time and thereby provides a faster labeling operation.

While the best mode for carrying out the the invention has been described in detail, those familiar with the art to which this invention relates will recognize various alternative designs and embodiments for practicing the invention as defined by the following claims.

What is claimed is:

1. An in-mold label dispenser for a blow molding machine including a plurality of molds, each mold including mold sections movable between open and closed positions, and the mold sections including cavity sections which cooperatively define a cavity in which the molding is performed with the mold sections in the closed position and which permit ejection of a molded part in the open position, the label dispenser comprising: a label magazine for storing labels; a base; a dispensing head mounted on the base for rectilinear movement along a first axis from adjacent the label magazine to between the mold sections of a mold in the open position; a label carrier mounted on the dispensing head for rectilinear movement along a second axis transverse to the first axis between retracted and extended positions; and a dispensing head and label carrier drive mechanism including first and second solid mechanical drives, the first solid mechanical drive extending from the base to the dispensing head and being operable to provide movement of the dispensing head back and forth between the label magazine and the mold sections of said mold in the open position, the second solid mechanical drive extending between the base and the label carrier and being operable to provide movement of the label carrier between its extended and retracted positions, said second drive including at least one elongated support on which the dispensing head is supported for movement along the length of the support between the label magazine and said mold, said elongated support having a longitudinal axis and being mounted on the base for rotation about its longitudnal axis, and the second drive also including means connecting the elongated support and the label carrier to provide the movement of the label carrier between the extended and retracted positions upon rotation of the elogated support, the first and second drives of the drive mechanism cooperating to move the dispensing head and label carrier during the cyclical operation that: (a) initially moves the label carrier from the retracted position to the extended position with the dispensing head adjacent the label magazine such that the label carrier receives a label from the magazine, (b) thereafter moves the label carrier to the retracted position with the label thereon and also moves the dispensing head to between the mold sections of said mold in the open position, (c) subsequently moves the label carrier to the extended position to deposit the label on one of the mold sections within the cavity section thereof, and (d) finally moves the label carrier back to the retracted position and moves the dispensing head from between the mold sections back to adjacent the label magazine in preparation for the next cycle.

2. A label dispenser as in claim 1 which includes a pair of the label magazines and a pair of the label carriers for depositing a pair of labels on the mold sections of the mold, and said pair of label carriers both being driven by the second solid mechanical drive.

3. A label dispenser as in claim 2 wherein the first solid mechanical drive for the dispensing head includes a drive linkage having first and second ends, a gear unit that is mounted on the base and drives the first end of the drive linkage, and a connection between the second end of the drive linkage and the dispensing head for providing dispensing head movement under the impetus of the gear unit.

4. A label dispenser as in claim 3 wherein the drive linkage of the first solid mechanical drive includes a pivotal lever drive by the gear unit and a link that connects the lever to the dispensing head, and said lever having a bent end pivotally connected to the link to provide increased movement of the dispensing head upon pivoting of the lever.

5. A label dispenser as in claim 3 wherein the second solid mechanical drive for the label carriers includes a pair of the elongated supports that cooperate to mount the dispensing head for its rectilinear movement, bearings that mount the elongated supports on the base for rotation about their longitudinal axis, the drive mechanism including a second gear unit that is mounted on the base and rotates the elongated supports, and said connecting means including a pair of cams that respectively extend between the pair of elongated supports and the pair of label carriers to provide extending and retracting movement of the label carriers upon rotation of the elongated supports under the impetus of the second gear unit.

6. A label dispenser as in claim 5 wherein the connection between the second end of the drive linkage and the dispensing head is located between the elongated supports on which the dispensing head is mounted for rectilinear movement.

7. A label dispenser as in claim 5 further including a common input for driving both gear units to coordinate the movement of the dispensing head and the label carriers.

8. A label dispenser as in claim 5 wherein the dispensing head includes a pair of parallel slideways on which the pair of label carriers are mounted for the rectilinear extending and retracting movement, each label carrier including an associated track mounted thereon extending transversely to the direction of rectilinear movement thereof, and each cam having a cam member received within the track of the associated label carrier.

9. A label dispenser as in claim 8 wherein the cam members have adjustable connections to the cams to control the degree of extending and retracting movement of the label carriers upon rotation of the elongated supports.

10. A label dispenser as in claim 1, 8, or 9 where the label carrier is made from plastic.

11. An in-mold label dispenser for a blow molding machine including a plurality of molds, each mold including a pair of mold sections movable between open and closed positions, and the mold sections including cavity sections which cooperatively define a cavity in which the molding is performed with the mold sections in the closed position and which permit ejection of a molded part in the open position, the label dispenser comprising: a label magazine for storing labels; a base; at least one elongated support rotatably mounted on the base and extending to between the mold sections of a mold in the open position; a dispensing head mounted for rectilinear movement along a first axis on the support from adjacent the label magazine to between the mold sections of the mold in the open position; a label carrier mounted on the dispensing head for rectilinear movement along a second axis transverse to the first axis between retracted and extended positions; a drive linkage having first and second ends; a first gear unit that drives the first end of the drive linkage; a connection between the second end of the drive linkage and the dispensing head for moving the dispensing head between the label magazine and the open mold sections under the impetus of the first unit; a second gear unit that rotatively drives the elongated support; a cam that extends between the elongated support and the label carrier to provide movement thereof between the retracted and extended positions upon rotation of the elongated support under the impetus of the second gear unit; and a common input for driving the first and second gear units in coordination with each other such that the driving: (a) initially moves the label carrier from the retracted position to the extended position with the dispensing head adjacent the label magazine so that the label carrier receives a label from the magazine, (b) thereafter moves the label carrier to the retracted position with the label thereon and also moves the dispensing head to between the mold sections of said mold in the open position, (c) subsequently moves the label carrier to the extended position to deposit the label on one of the mold sections within the cavity section thereof, and (d) finally moves the label carrier back to the retracted position and moves the dispensing head from between the mold sections back to adjacent the label magazine in preparation for the next cycle.

12. An in-mold label dispenser for a blow molding machine including a plurality of molds, each mold includng a pair of mold sections movable between open and closed positions, and the mold sections including cavity sections which coopertively define a cavity in which the molding is performed with the mold sections in the closed position and which permit ejection of a molded part in the open position, the label dispenser comprising: a pair of spaced label magazines for storing labels; a base; a pair of elongated supports rotatably mounted on the base and extending parallel to each other to between the mold sections of a mold in the open position; a dispensing head mounted for rectilinear movement along a first axis on the support from between the magazines to between the mold sections of the open mold; a pair of label carriers mounted on the dispensing head for parallel movement to each other along a second axis transverse to the first axis between retracted positions and oppositely projecting extended positions; a drive linage having first and second ends; a first gear unit that drives the first end of the drive linkage; a connection between the second end of the drive linkage and the dispensing head at a location between the elongated supports such that driving of the drive linkage under the impetus of the first gear unit moves the dispensing head between the label magazines and the open mold sections; a second gear unit that rotatively drives the pair of elongated supports; a pair of cams that respectively extend between the pair of elongated supports and the pair of label carriers to provide movement thereof between the retracted and extended positions upon rotation of the elongated supports under the impetus of the second gear unit; and a common input for driving the first and second gear units in coordination with each other such that the driving: (a) initially moves the pair of label carriers from the retracted positions to the extended positions with the dispensing head between the label magazines so that the pair of label carriers respectively receive a pair of labels from the pair of label magazines, (b) thereafter moves the pair of label carriers to the retracted positions with the labels thereon and also moves the dispensing head to between the mold sections of the open mold, (c) subsequently moves the label carriers to the extended positions to deposit the labels on the mold sections of the open mold within the cavity sections thereof, and (d) finally moves the label carriers back to the retracted positions and moves the dispensing head from between the mold sections back to between the label magazines in preparation for the next cycle.

* * * * *

UNITED STATES PATENT AND TRADEMARK OFFICE
CERTIFICATE OF CORRECTION

PATENT NO. : 4,479,770
DATED : October 30, 1984
INVENTOR(S) : William A. Slat et al.

It is certified that error appears in the above-identified patent and that said Letters Patent is hereby corrected as shown below:

Column 6, line 18, "permi" should read -- permit --.

Column 6, line 18, after "permit" insert -- the vacuum --.

Column 10, line 18, "drive" should read -- driven --.

Column 10, line 28, "axis" should read -- axes --.

Column 11, line 40, "includng" should read -- including --.

Column 12, line 13, "linage" should read -- linkage --.

Signed and Sealed this

Ninth Day of April 1985

[SEAL]

Attest:

DONALD J. QUIGG

Attesting Officer

Acting Commissioner of Patents and Trademarks